US008235182B2

(12) United States Patent
Chen

(10) Patent No.: US 8,235,182 B2
(45) Date of Patent: Aug. 7, 2012

(54) BUFFERING DEVICE FOR BRAKE MECHANISM FOR ADJUSTING PRESSURE ON WHEELS

(76) Inventor: Jin-Kuan Chen, Changhua (TW)

( * ) Notice: Subject to any disclaimer, the term of this patent is extended or adjusted under 35 U.S.C. 154(b) by 1240 days.

(21) Appl. No.: 12/007,401

(22) Filed: Jan. 10, 2008

(65) Prior Publication Data
US 2009/0178891 A1 Jul. 16, 2009

(51) Int. Cl.
B62L 5/00 (2006.01)
B62L 3/00 (2006.01)
(52) U.S. Cl. .................................. 188/26; 188/24.22
(58) Field of Classification Search ............... 188/24.11, 188/24.12, 24.22, 26, 2 D, 250 B, 72.7, 72.9, 188/70 R, 70 B
See application file for complete search history.

(56) References Cited

U.S. PATENT DOCUMENTS

| 4,823,915 | A | * | 4/1989 | Nagano | 188/2 D |
| 6,152,266 | A | * | 11/2000 | Takizawa | 188/24.21 |
| 6,394,236 | B1 | * | 5/2002 | Matsuishita | 188/72.7 |
| 6,564,910 | B1 | * | 5/2003 | Chen et al. | 188/26 |
| 2001/0047911 | A1 | * | 12/2001 | Lumpkin et al. | 188/24.11 |
| 2007/0215415 | A1 | * | 9/2007 | Sandro et al. | 188/24.14 |

* cited by examiner

Primary Examiner — Robert A Siconolfi
Assistant Examiner — Anna Momper
(74) Attorney, Agent, or Firm — Raymond Y. Chan; David and Raymond Patent Firm

(57) ABSTRACT

A brake mechanism for brake system includes a pad connector and a pad support to which the brake pad is connected, two link units are pivotably connected between the pad connector and the pad support. A buffering device is connected to two respective first ends of the pad connector and the pad support. When the brake pad touches the spinning wheel, the brake pad together with the pad support are movable relative to the pad connector such that the wheel is not sudden stopped completely and the pressure that the brake pad applies to the wheel can also be adjusted.

6 Claims, 17 Drawing Sheets

BUFFERING DEVICE FOR BRAKE MECHANISM FOR ADJUSTING PRESSURE ON WHEELS

FIELD OF THE INVENTION

The present invention relates to a brake mechanism for absorbing shocking and adjusting pressure applied on the wheels by the brake pads.

BACKGROUND OF THE INVENTION

A conventional bicycle brake mechanism generally includes two calipers pivotably connected to the front fork and seat stays and a brake pad is connected to an end of each caliper. The other end of each of the calipers is connected to the brake cable which is operated by a brake lever on the handlebar. The brake cable is pulled when the rider pulls the brake lever and the corresponding caliper is pivoted to move the brake pad to contact and stop the wheel. However, when the bicycle moves at high speed, the brake pads suddenly stop the wheels, the wheel that is stopped makes the bicycle to flip and lose control. This is a dangerous situation especially when the traffic is heavy.

Some manufacturers provide two-step brake mechanism which allows the brake pads to synchronously touch the wheel. However, this does not improve the problem mentioned above and involves even more number of parts.

The present invention intends to provide a brake mechanism for both conventional brake system and disk brake system, the brake pads do not clamp the wheel overly and prevent the wheel from being stopped suddenly.

SUMMARY OF THE INVENTION

The present invention relates to a brake mechanism for bicycles and comprises two link units pivotaby connected between a pad connector and a pad support to which a brake pad is connected. A gap is defined between the pad connector and the pad support. A buffering device is connected to two respective first ends of the pad connector and the pad support. When the pad support touches the wheel the pad support is movable relative to the pad connector.

The primary object of the present invention is to provide a brake system which is cooperated with conventional caliper brake system and disk brake system, the pressure that the brake pads apply to the wheel can be regulated.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
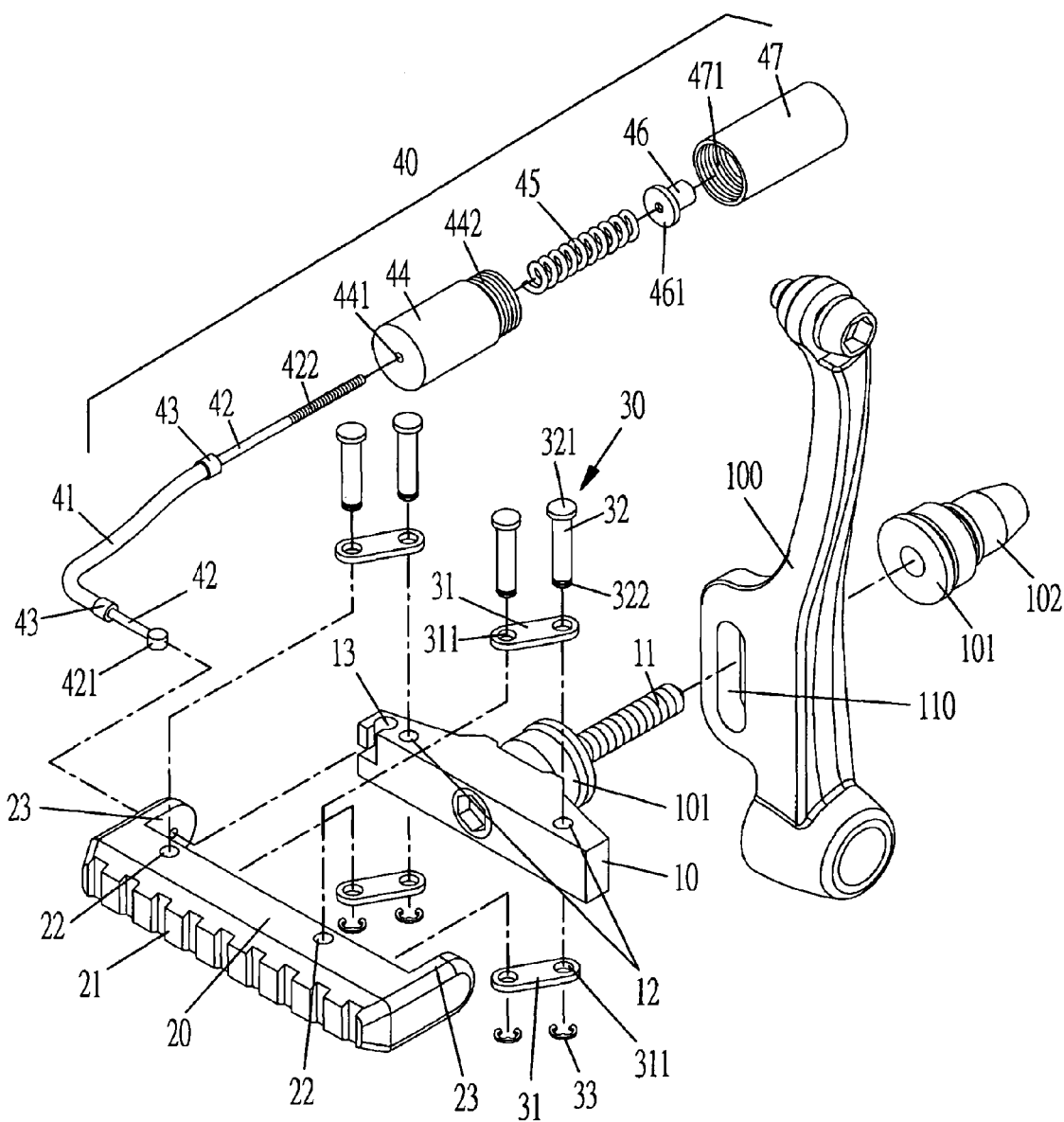
FIG. 1 is an exploded view to show the first embodiment of brake mechanism of the present invention.

Referring to FIGS. 1 to 6, the brake mechanism of the present invention is cooperated with one of two brake calipers 100 which are located on two sides of the wheel and the brake cable has one end connected to an end of the caliper 100 and the other end of the brake cable is connected to a brake lever on the handlebar of the bicycle.

The brake mechanism comprises two link units 30 pivotaby connected between a pad connector 10 and a pad support 20 to which a brake pad 21 is connected. A gap is defined between the pad connector 10 and the pad support 20. A buffering device 40 is connected to two respective first ends of the pad connector 10 and the pad support 20. The pad support 20 is movable relative to the pad connector 10 when the pad support 20 is in contact with the wheel. The pad connector 10 includes a threaded rod 11 extending from a rear side thereof and the threaded rod 11 extends through a slot 110 defined through the caliper 100, a washer 101 and is fixed to a nut 102. Different types of calipers can also be cooperated with the brake system. The pad connector 10 includes two first holes 12 and the pad support 20 includes second holes 22. Four pins 32 of the link units 30 extend through the first and second holes 12, 22 respectively and two pairs of links 31 are connected between the four pins 32 respectively. Each pin 32 includes a head 321 on one end thereof and an annular groove 322 is defined in the other end of each pin 32. The two pairs of link 31 are connected across the gap and each link 31 includes two circular holes 311 through which the pin 32 extends. Clips 33 are used to engage with the annular grooves 322 of the pins 32 and therefore position the pins 32. A recess 13 is defined in the first end of the pad connector 10 and a sink hole 231 is defined in one of two side wings 23 of the first end of the pad support 20.

The buffering device 40 includes a cable 42 with a sheath 41 mounted to an outside thereof. The cable 42 extends through the sink hole 231 and a stop piece 43 is connected to an end of the sheath 41 so as to be stopped and rested in the sink hole 231 in the first end of the pad support 20. An end piece 421 is connected to an end of the cable 42 and is engaged with the recess 13. A threaded section 422 is connected to the other end of the cable 42 and extends into a tube 44 via a through hole 441 in a closed end of the tube 44. A resilient member 45 is mounted to the threaded section 422 and an adjustment nut 46 is threadedly connected to the threaded section 422 to position the resilient member 45. Another stop piece 43 is connected to the other end of the sheath 41 and stopped on an end surface of the closed end of the tube 44. The tube 44 includes an outer threaded portion 442 so as to be threadedly connected with threaded hole 471 of a mounting tube 47. It is noted that the resilient member 45 can be a compression spring or a hydraulic cylinder (not shown).

Figure 2:
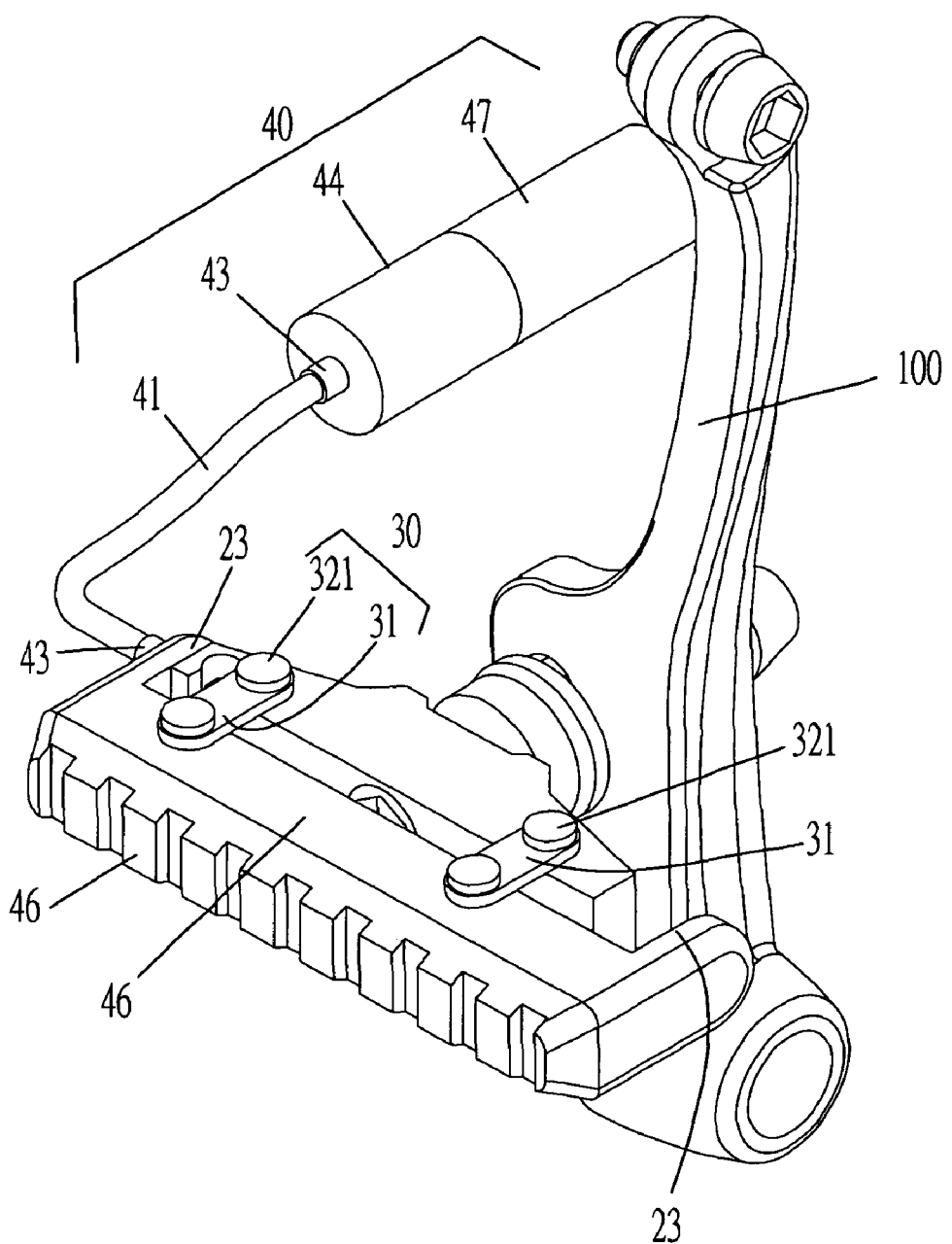
FIG. 2 is a perspective view to show the buffering device of the brake mechanism of the present invention.
Figure 3:
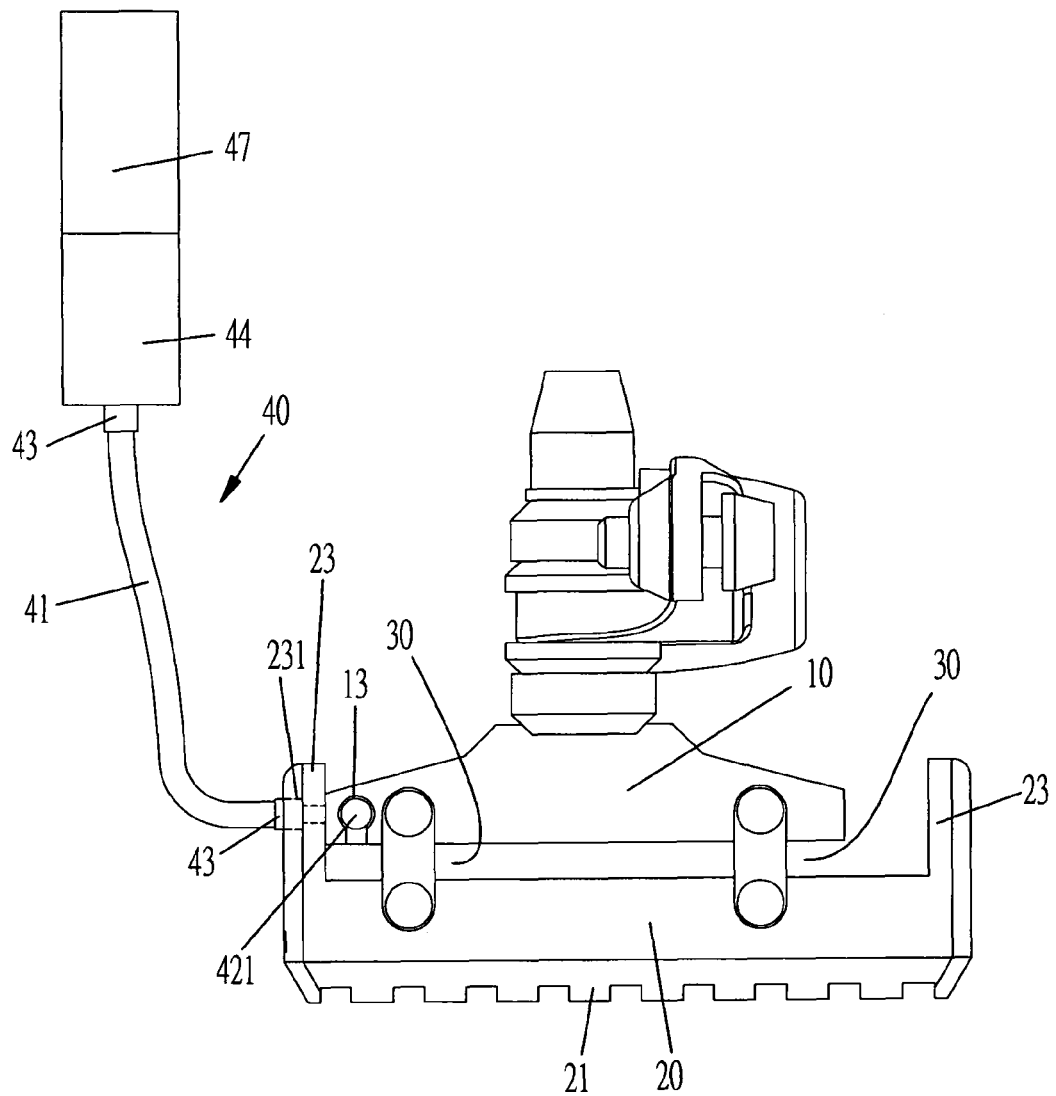
FIG. 3 is a top view to show the buffering device of the brake mechanism of the present invention.

The adjustment nut 46 can be rotated to adjust the force applied to the resilient member 45 which generates a bounce force to pull the cable 42 at the end with the end piece 421 which is engaged with the recess 13. The stop piece 43 is rested in the sink hole 231 so that when the end piece 421 is pulled, the pad connecter 10 is moved such that the first end of the pad connecter 10 contacts against the side wing 23 as shown in FIGS. 2 and 3. The bouncing force is stored in the resilient member 45 when the brake pad 21 is not yet in contact with the wheel.

Figure 4:
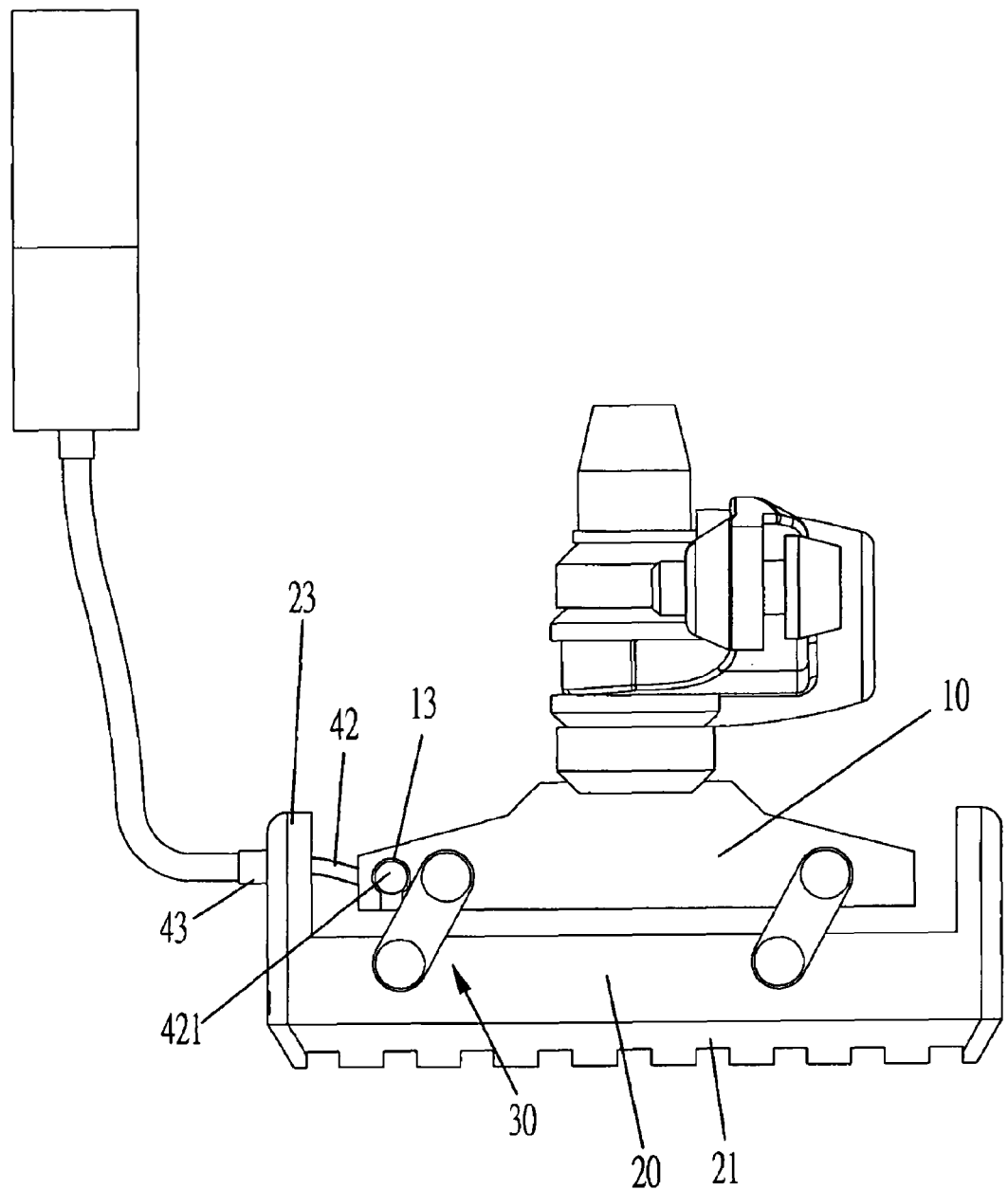
FIG. 4 is a top view to show the pad support is moved relative to the pad connector of the brake mechanism of the present invention.
Figure 5:
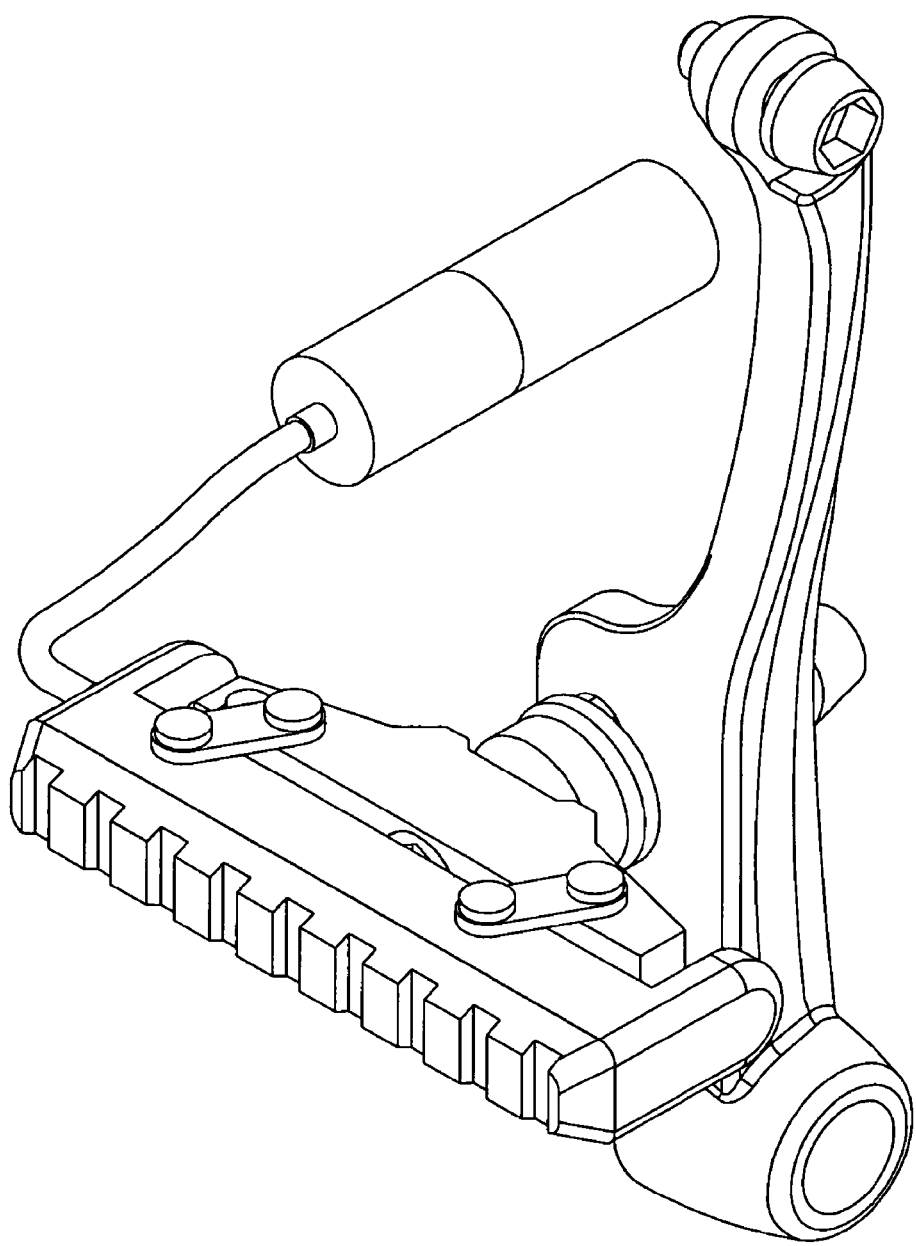
FIG. 5 is a perspective view of the status in FIG. 4.
Figure 6:
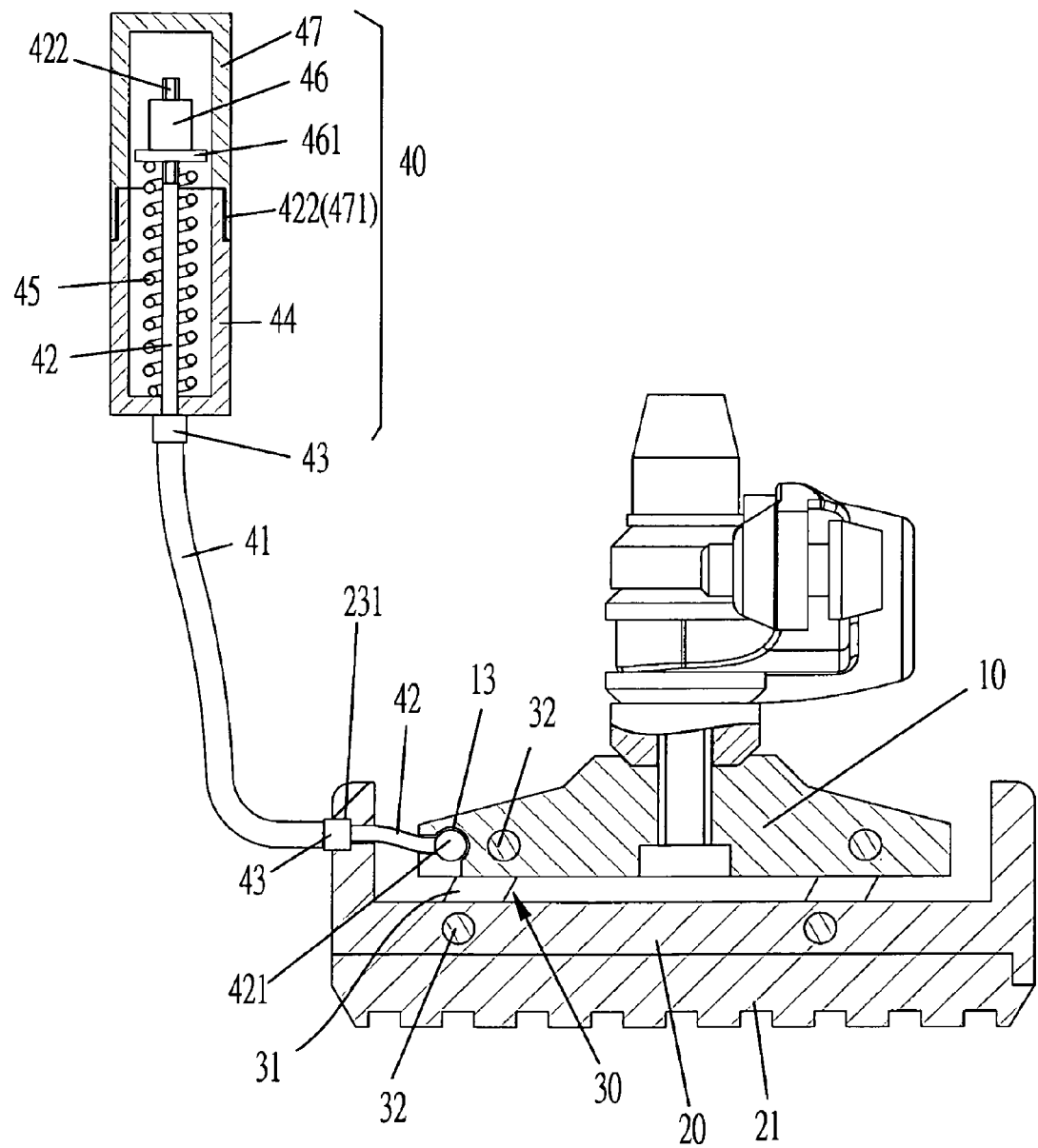
FIG. 6 is a partial cross sectional view to show the status in FIG. 4.
Figure 7:
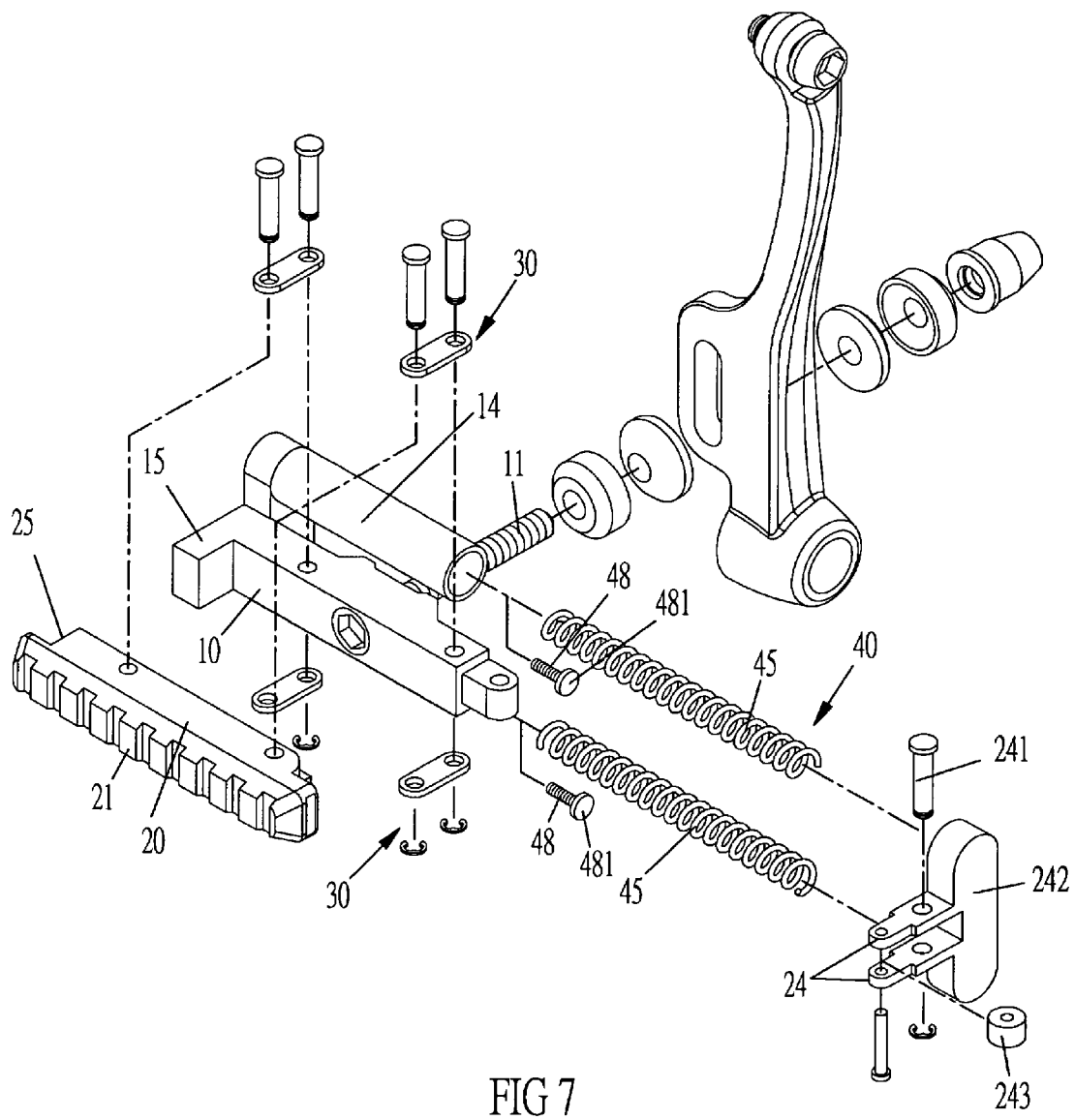
FIG. 7 is an exploded view to show the second embodiment of brake mechanism of the present invention.
Figure 8:
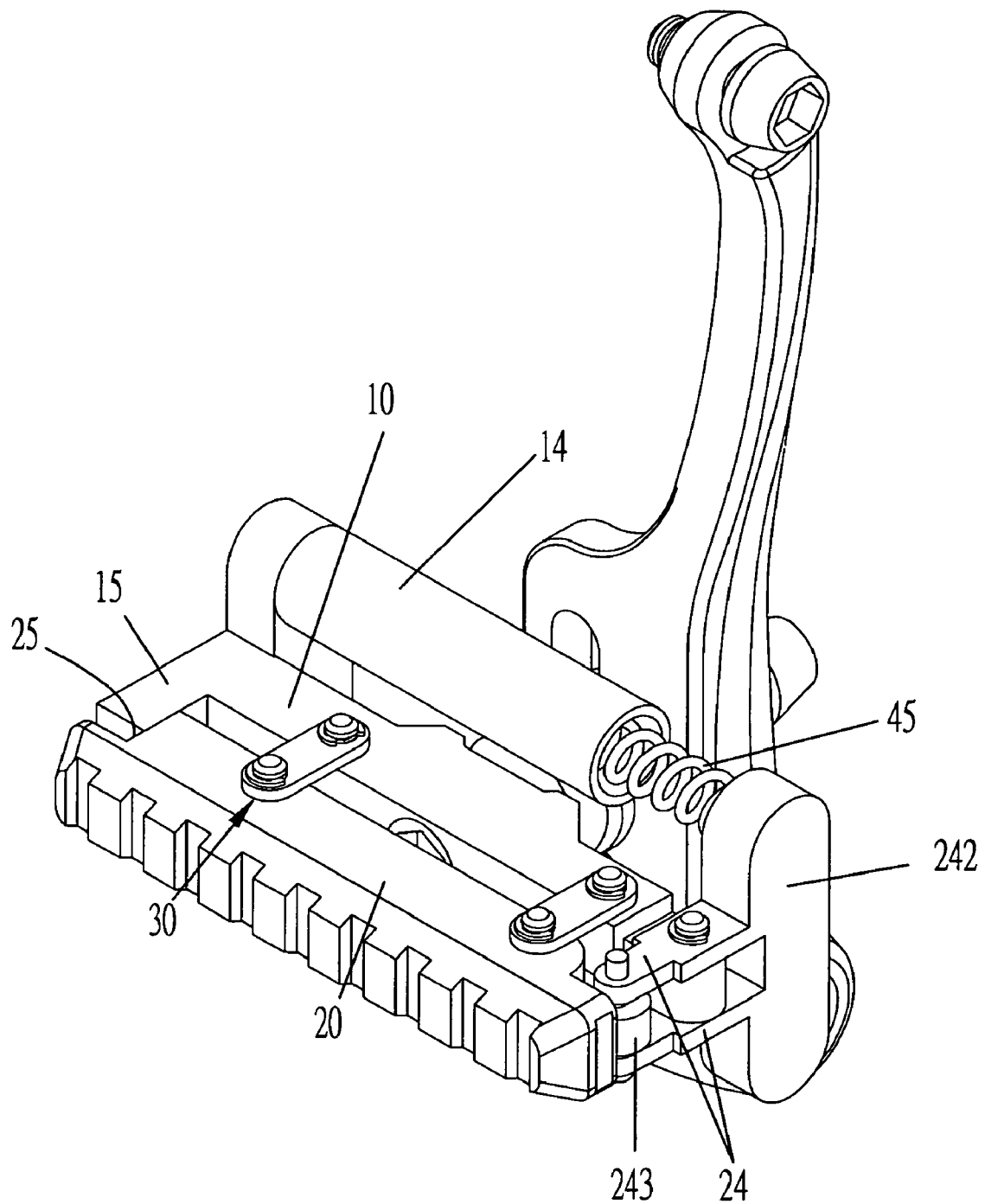
FIG. 8 is a perspective view to show the buffering device of the brake mechanism of the present invention in FIG. 7.
Figure 9:
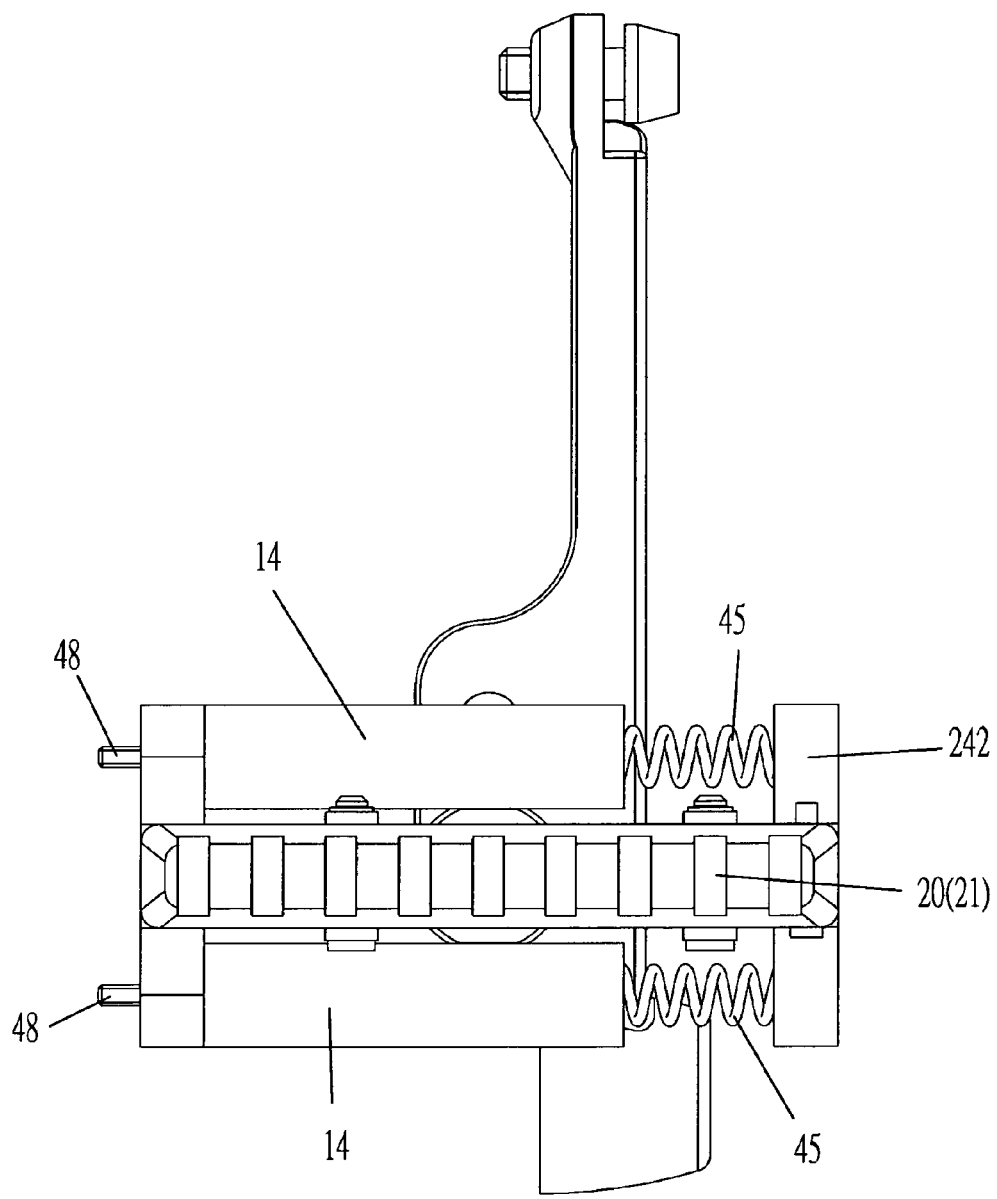
FIG. 9 is a top view to show the buffering device of the brake mechanism of the present invention in FIG. 7.
Figure 10:
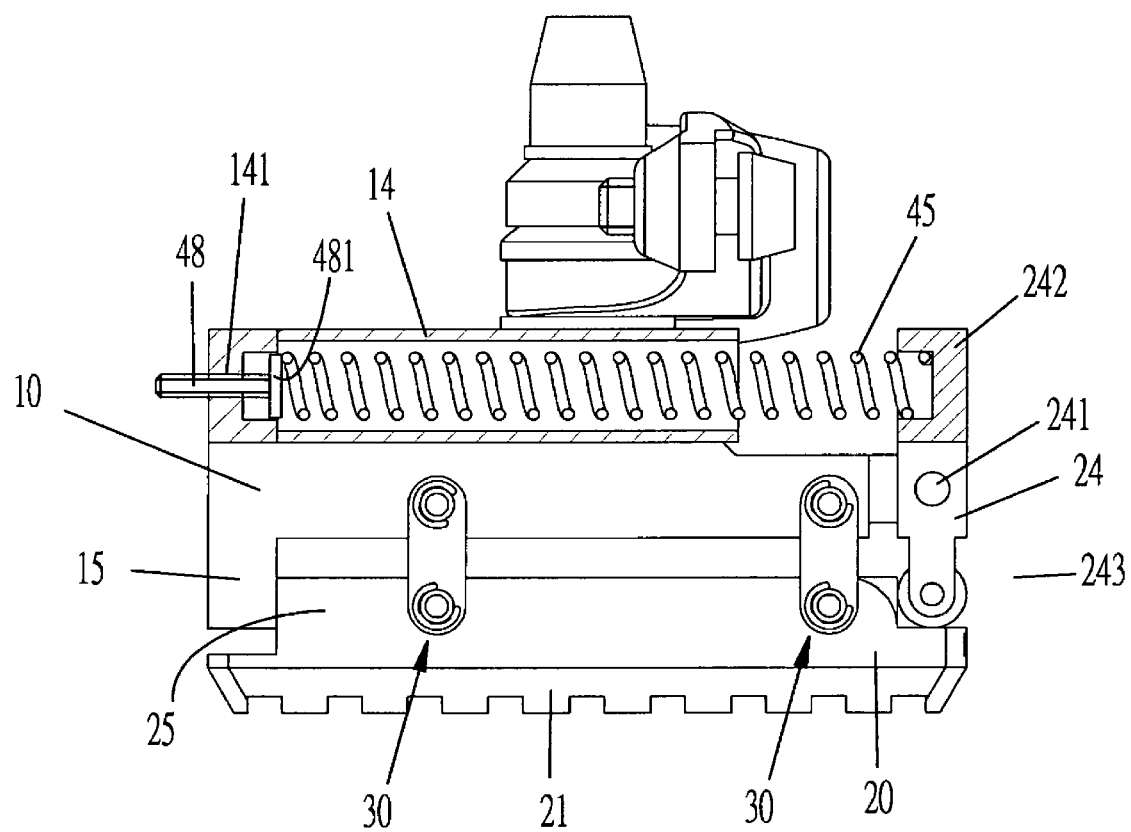
FIG. 10 is a partial cross sectional view of the buffering device of the brake mechanism of the present invention in FIG. 7.
Figure 11:
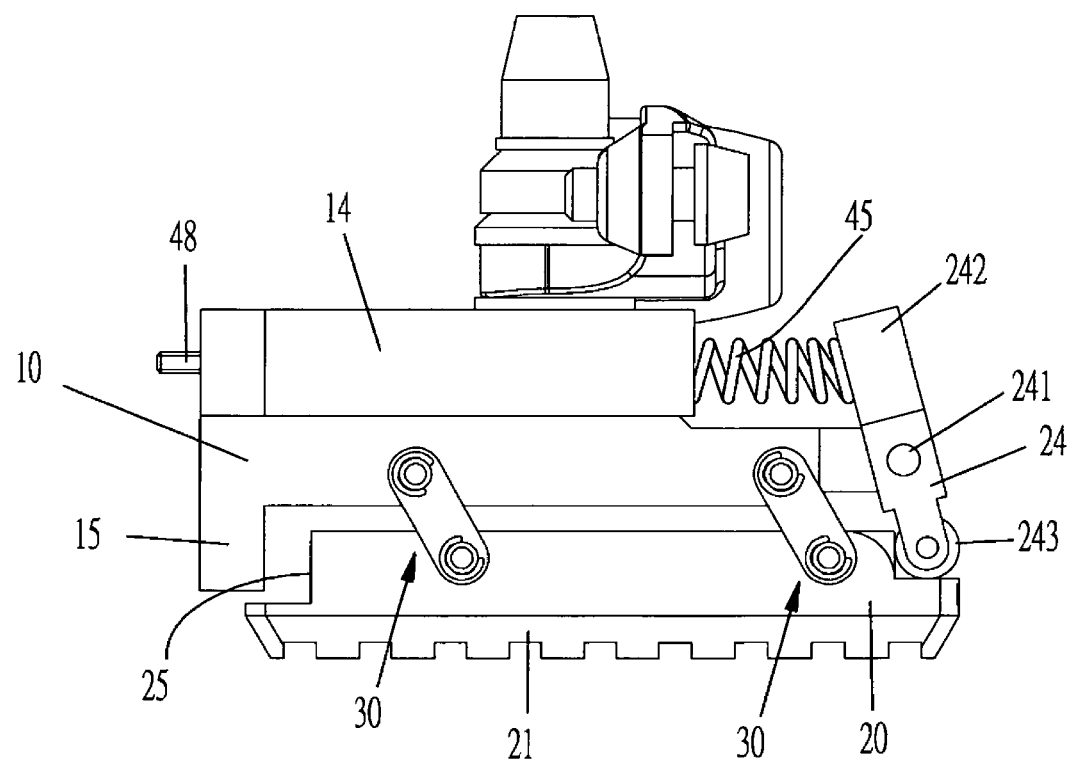
FIG. 11 shows the pad support is moved relative to the pad connector of the brake mechanism of the present invention in FIG. 7.
Figure 12:
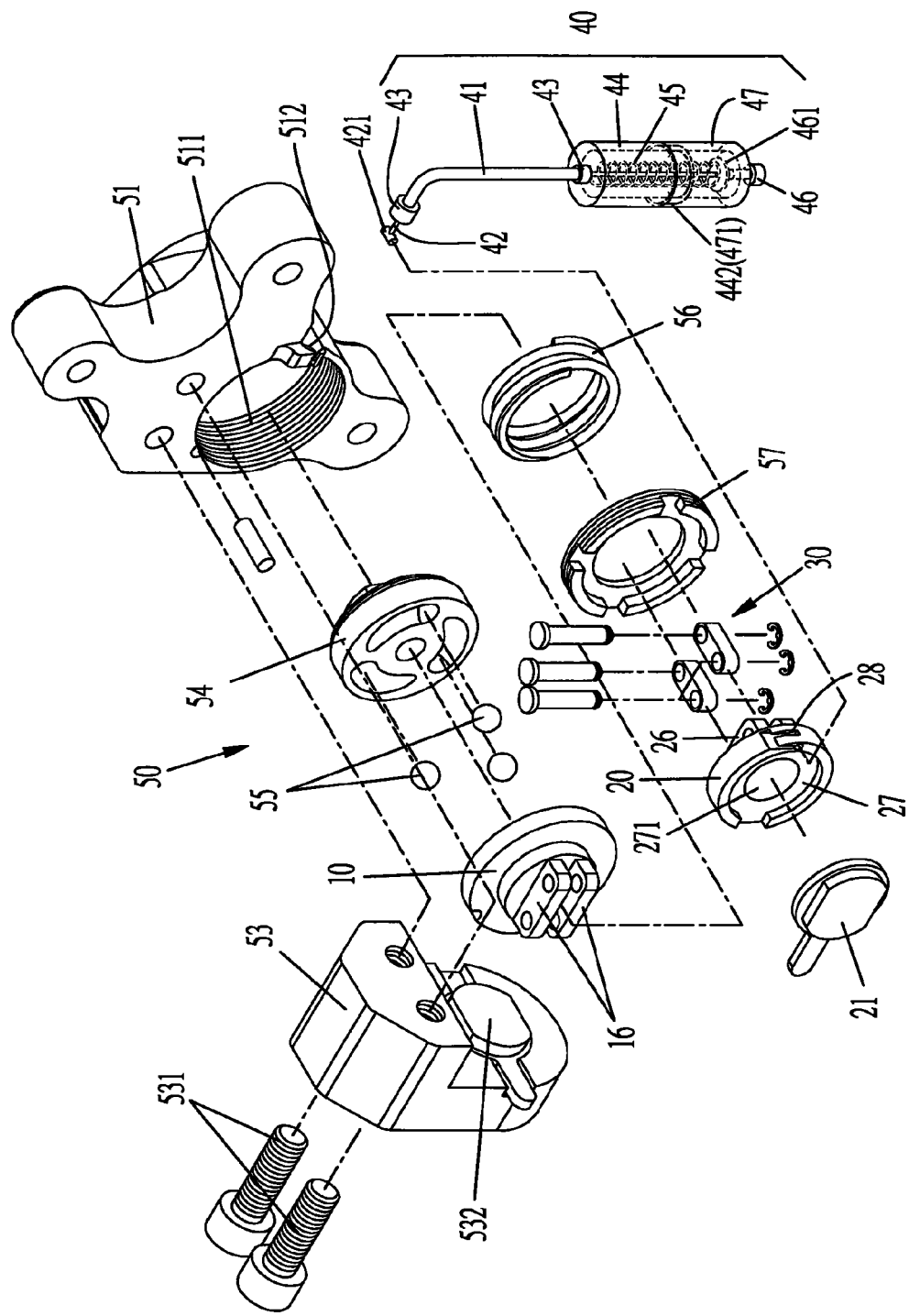
FIG. 12 is an exploded view to show the third embodiment of brake mechanism of the present invention.
Figure 13:
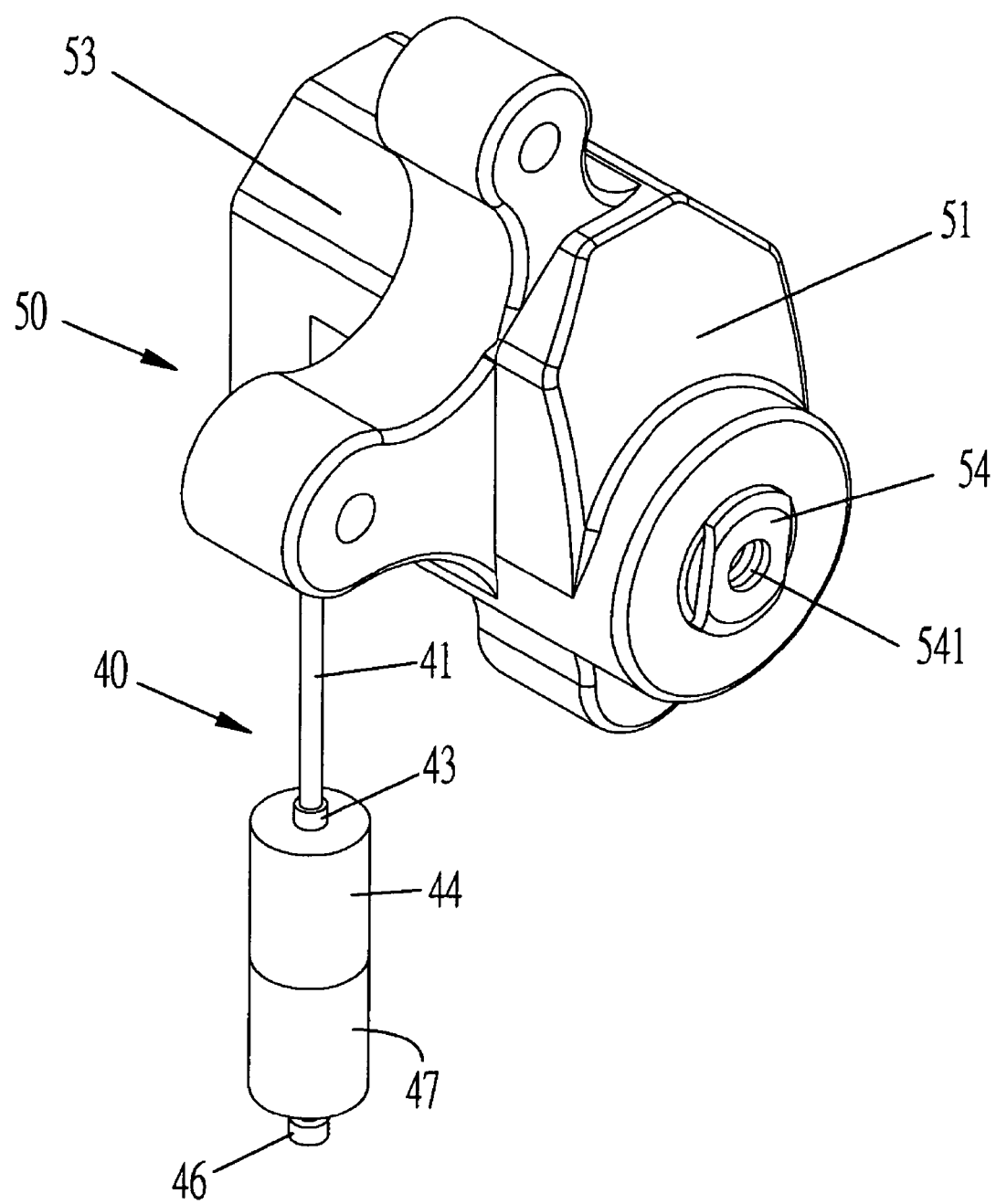
FIG. 13 is a perspective view to show the buffering device of the brake mechanism of the present invention in FIG. 12.
Figure 14:
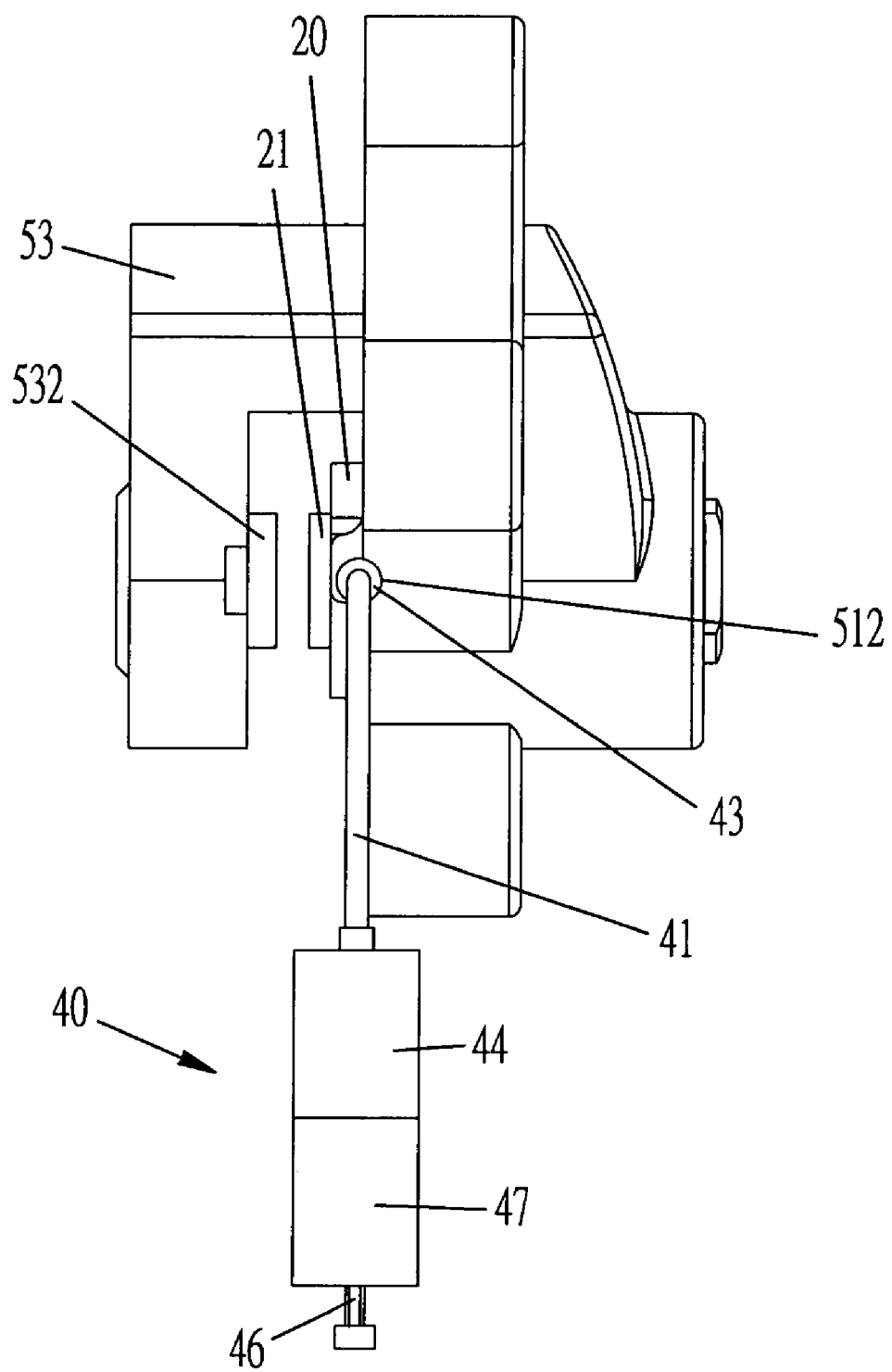
FIG. 14 is a side view of the buffering device of the brake mechanism of the present invention in FIG. 12.
Figure 15:
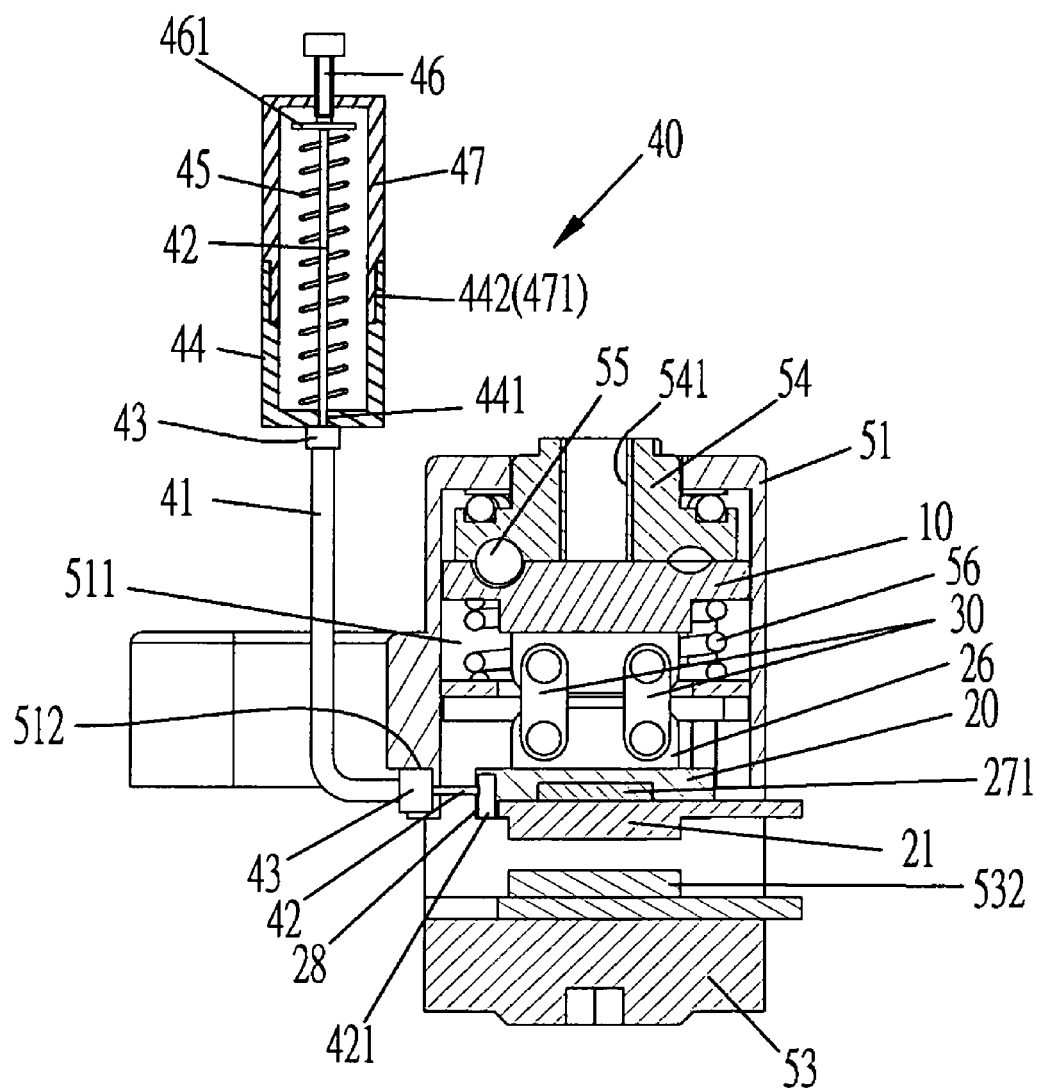
FIG. 15 is a cross sectional view to show the brake pad of the embodiment in FIG. 12 is moved.

As shown in FIGS. 4 to 6, when the brake pad 21 contacts the wheel (not shown), the pad support 20 is shifted by the wheel while the pad connecter 10 is remained still. The cable 42 becomes shorter in the tube 44 to further compress the resilient member 45. The bouncing force of the resilient member 45 is used to push the pad support 20 back. The movement of the pad support 20 is capable of absorbing and buffering the shocks between the brake pad 21 and the wheel, and the pressure applied to the wheel by the brake pad 21 can also be adjusted.

FIGS. 7 to 11 show a second embodiment of the present invention wherein the difference from the first embodiment is the buffering device 40 which comprises two positioning cases 14 located on a top and an underside of the pad connector 10. Two respective ends of the two positioning cases 14 are connected to the first end of the pad connector 10. Each positioning case 14 includes an open end.

A swing member 24 includes two lugs is pivotably connected to a second end of the pad connector 10 and a stop board 242 is connected to the swing member 24. A roller 243 is connected to the swing member 24 and is in contact with the pad support 20. Two resilient members 45 are inserted into the open ends of the two positioning cases 14 respectively and the other end of each of the two resilient members 45 is stopped by the stop board 242. A concavity 25 is defined in the first end of the pad support 20 and an end block 15 extends from the first end of the pad connecter 10, the end block 15 is engaged with the concavity 25. The concavity 25 is designed to set a limit for the movement of the end block 15. Again, the resilient member 45 can be a compression spring or a hydraulic cylinder (not shown).

The positioning cases 14 each include a threaded hole 141 defined in a closed end thereof and two adjustment bolts 48 threadedly extend through the two threaded holes 141. The two adjustment bolts 48 each have a head 481 which is located in the positioning case 14 corresponding thereto and the resilient member 45 is in contact with the head 481 in each positioning case 14.

When the brake pad 21 is in contact with the wheel and the pad support 20 is moved relative to the pad connecter 10, the swing 24 is pivoted and the stop board 242 compresses the resilient members 45 so that the resilient member 45 will generate a force to move the pad support 20 back.

FIGS. 12 to 15 show the brake mechanism is cooperated with a disk brake system 50 which includes a body 51 which has an opened chamber 511 and a mounting member 53 is connected to the end surface of the body 51 by bolts 531. The mounting member 53 includes a brake pad 532 which is magnetically connected to the mounting member 53. A rotational member 54, beads 55, the pad connecter 10, a resilient member 56 and a collar 57 are engaged with the chamber 511 in sequence. The rotational member 54 is threadedly connected to a rod (not shown) and the pad connecter 10 is moved in parallel by operation of the rod.

Two lugs 16 extend from the pad connecter 10 and another two lugs 26 extend from the pad support 20. Two link units 30 are pivotably connected between the two pairs of lugs 16 and 26. The pad support 20 includes an engaging hole 27 in an outside thereof and a magnet 271 is magnetically connected in the engaging hole 27. A brake pad 21 is magnetically connected to the magnet 271. The pad support 20 includes a positioning hole 28 in an outer periphery thereof and the buffering device 40 has an end engaged with the positioning hole 28. A sink hole 512 is defined in the body 51 and located corresponding tot eh positioning hole 28.

The buffering device 40 includes a cable 42 with a sheath 41 mounted to an outside thereof. The cable 42 extends through the sink hole 512 and a stop piece 43 is connected to an end of the sheath 41 so as to be stopped and rested in the sink hole 512 of the pad support 20. An end piece 421 is connected to an end of the cable 42 and is engaged with the positioning hole 28. A threaded section 422 is connected to the other end of the cable 42 and extends into a tube 44 via a through hole 441 in a closed end of the tube 44. A resilient member 56 is mounted to the threaded section 422 and an adjustment nut 46 is threadedly connected to the threaded section 422. The adjustment nut 46 includes a head 461 against which the resilient member 56 Another stop piece 43 is connected to the other end of the sheath 41 and stopped on an end surface of the closed end of the tube 44. The tube 44 includes an outer threaded portion 442 so as to be threadedly connected with threaded hole 471 of a mounting tube 47. It is noted that the resilient member 56 can be a compression spring or a hydraulic cylinder (not shown). The pressure applied to the brake disk by the brake pad 21 can be adjusted and buffered.

Figure 16:
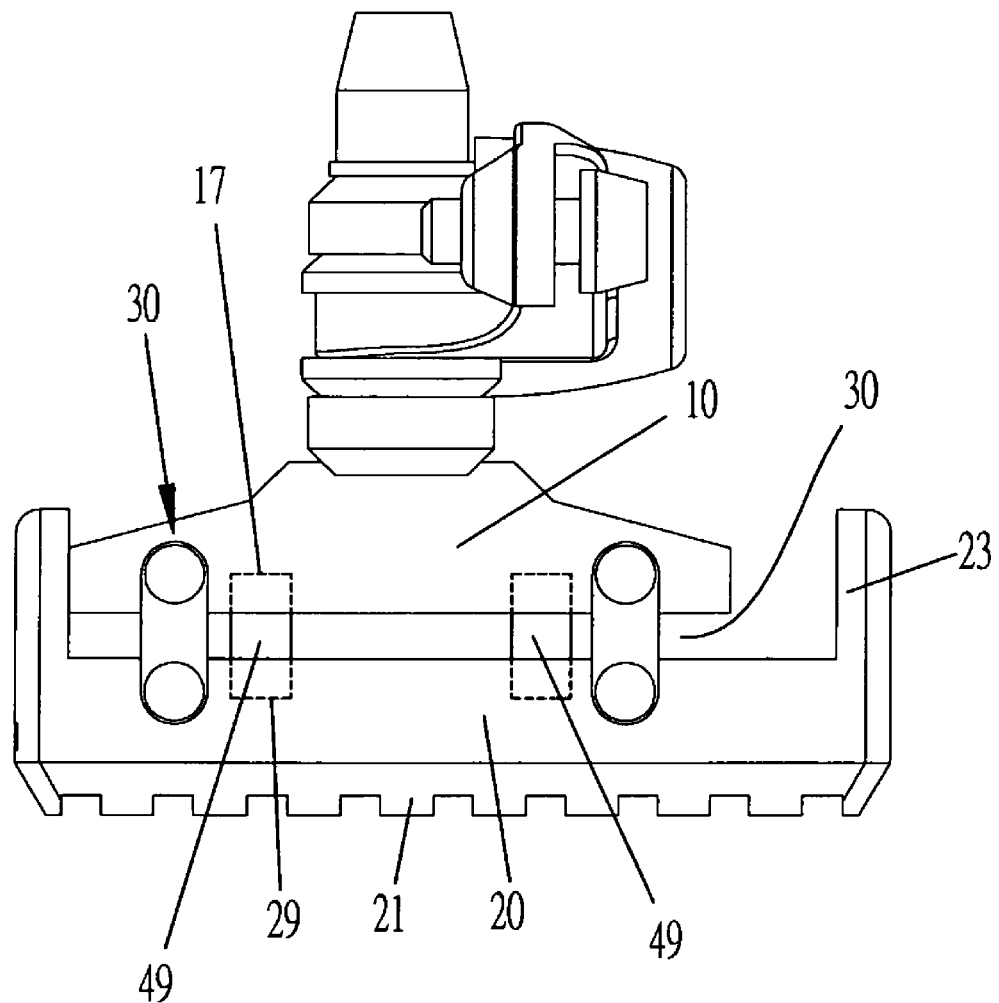
FIG. 16 is a plain view to show the fourth embodiment of the brake mechanism of the present invention.
Figure 17:
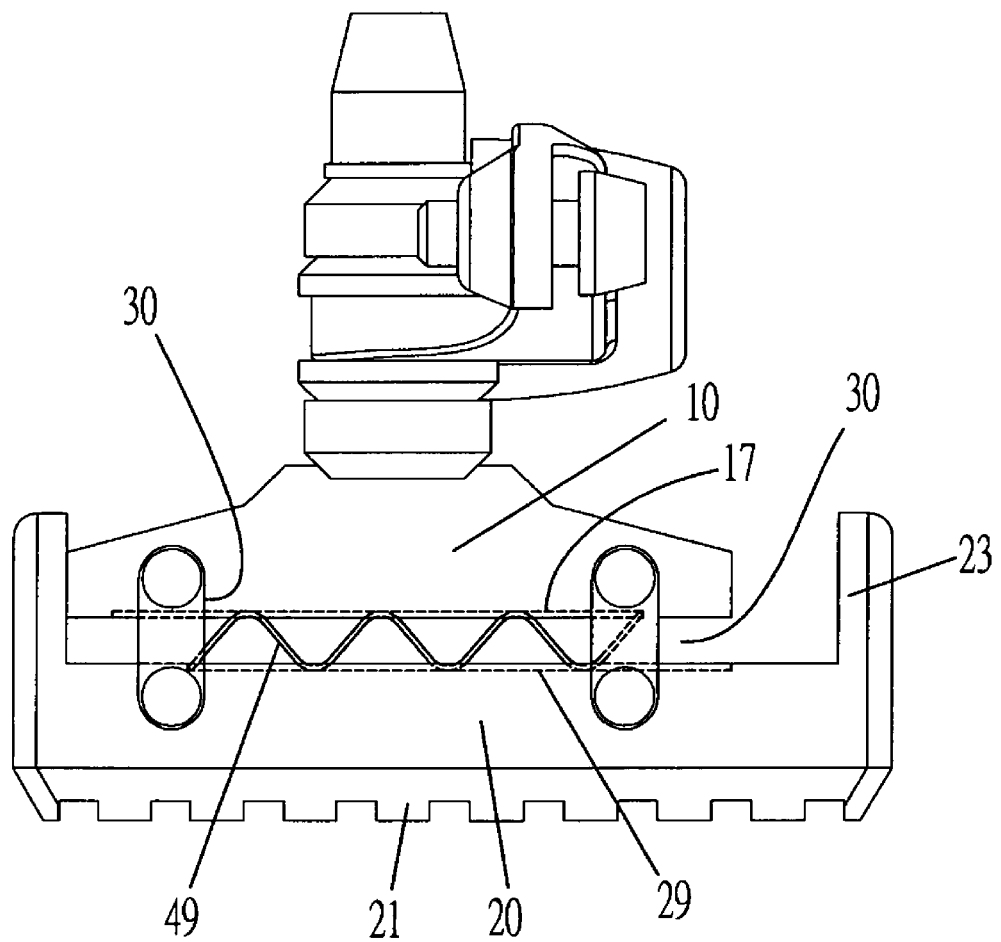
FIG. 17 is a plain view to show the fifth embodiment of the brake mechanism of the present invention.

FIGS. 16 and 17 show that the buffering device 40 can be a resilient member 49 such as a rubber piece or a spring plate. For positioning the resilient member 49, the pad connecter 10 and the pad support 20 includes notches 17 and grooves 29 which are located corresponding to the notches 17. The two ends of the rubber pieces can be securely engaged with the notches 17 and the grooves 29 as shown in FIG. 16. As shown in FIG. 17, the spring plate can be engaged with the notches 17 and the grooves 29 defined in two respective insides of the pad connecter 10 and the pad support 20. Therefore, the rubber piece and the spring plate provide a force to pull the pad support 20 back.

While we have shown and described the embodiment in accordance with the present invention, it should be clear to those skilled in the art that further embodiments may be made without departing from the scope of the present invention.

What is claimed is:
1. A brake mechanism for a wheel, comprising:
a disk brake system;
a pad connector connected with said disk brake system;
a pad support movably coupled with said pad connector for supporting a brake pad at said pad support, wherein said pad support is moved by said disk brake system in response to an actuation of said pad connector when said pad support is moved for braking said wheel; and a buffering device, which comprises:
a cable having a first end coupled at said pad support;
a tube having a through hole, wherein an opposed second end of said cable is extended into said tube through said through hole and is extended to a closed end of said tube; and
a resilient member, which is received in said tube and coupled with said cable, for applying pressure to said brake pad responsive to said wheel through said cable, wherein when said pad support is shifted for braking said wheel, a length of said cable within said tube is shortened to compress said resilient member for generating a bouncing force thereat, such that said bouncing force of said resilient member pushes said pad support back for absorbing and buffering shocks between said brake pad and said wheel.

2. The brake mechanism, as recited in claim 1, wherein said buffering device further comprises an adjustment nut threadedly connected to said second end of said cable and having a head pressing against said resilient member for selectively adjusting said bounding force of said resilient member.

3. The brake mechanism, as recited in claim 1, further comprising two link units pivotably connected between said pad connector and said pad support such that a gap is defined therebetween, wherein two first holes are formed at said pad connector and two second holes are formed at said pad support, wherein each of said link units comprises two pins and a link which is extended across said gap and has two circular holes aligned with said corresponding first and second holes of said pad connector and said pad support respectively, wherein one of said pins is coupled between said link and said pad connector through said first hole and said corresponding circular hole while another said pin is coupled between said link and said pad support through said second hole and said corresponding circular hole.

4. The brake mechanism, as recited in claim 1, wherein said pad support has a positioning hole formed at an outer periphery thereof, wherein said first end of said cable is extended through said positioning hole to couple with said pad support.

5. The brake mechanism, as recited in claim 4, wherein said disk brake system comprises a body supporting said pad support, wherein said body has a sink hole aligned with said positioning hole of said pad support such that said first end of said cable is extended through said sink hole to couple with said pad support.

6. The brake mechanism, as recited in claim 1, wherein said resilient element is a compression spring received in said tube.

\* \* \* \* \*